United States Patent
Chen et al.

(10) Patent No.: US 7,679,992 B2
(45) Date of Patent: Mar. 16, 2010

(54) WETTABILITY FROM ELECTRO-KINETIC AND ELECTRO-OSMOSIS MEASUREMENTS

(75) Inventors: Min-Yi Chen, Pearland, TX (US); Jeffrey A. Tarvin, Boston, MA (US); Austin Boyd, Ridgefield, CT (US)

(73) Assignee: Schlumberger Technology Corporation, Cambridge, MA (US)

( * ) Notice: Subject to any disclaimer, the term of this patent is extended or adjusted under 35 U.S.C. 154(b) by 0 days.

(21) Appl. No.: 11/617,037

(22) Filed: Dec. 28, 2006

(65) Prior Publication Data

US 2008/0159073 A1 Jul. 3, 2008

(51) Int. Cl.
*G01V 1/00* (2006.01)
(52) U.S. Cl. .......................................... 367/25; 324/347
(58) Field of Classification Search ................. 324/339, 324/334, 347; 367/25
See application file for complete search history.

(56) References Cited

U.S. PATENT DOCUMENTS

| | | | | |
|---|---|---|---|---|
| 3,599,085 | A | * | 8/1971 | Semmelink ................. 324/386 |
| 4,427,944 | A | * | 1/1984 | Chandler .................... 324/353 |
| 5,417,104 | A | | 5/1995 | Wong |
| 5,503,001 | A | | 4/1996 | Wong |
| 6,225,806 | B1 | | 5/2001 | Millar et al. |
| 6,842,697 | B1 | | 1/2005 | Millar et al. |
| 6,978,672 | B1 | | 12/2005 | Chen et al. |
| 2004/0196046 | A1 | * | 10/2004 | Aidan et al. ................. 324/339 |
| 2005/0279495 | A1 | | 12/2005 | Chen et al. |
| 2005/0279497 | A1 | | 12/2005 | Chen et al. |
| 2005/0280419 | A1 | | 12/2005 | Chen et al. |
| 2006/0089804 | A1 | | 4/2006 | Chen et al. |
| 2006/0125474 | A1 | | 6/2006 | Chen et al. |
| 2007/0057674 | A1 | | 3/2007 | Chen et al. |
| 2007/0170924 | A1 | | 7/2007 | Chen et al. |

OTHER PUBLICATIONS

Alkafeef, S.F., et al., Hydrodynamic thickness of petroleum oil absorbed layers in the pores of reservoir rocks, Journal of Colloid and Interface Science, 2006, pp. 13-19, vol. 298.

Chandler, R., Transient streaming potential measurements on fluid-saturated porous structures: An experiment verification of Biot's slow wave in the quasi-static limit, Journal of the Acoustical Society of America, Jul. 1981, pp. 116-121, vol. 70, Issue 1.

Pengra, D.B., et al., Low-frequency AC electrokinetics, Colloids and Surfaces A: Physicochemical and Engineering Apects, 1999, pp. 283-292. vol. 159, Issues 2-3.

Pengra, D.B., et al., Determination of rock properties by low-frequency AC electrokinetics, Journal of Geophysical Research, Dec. 1999, pp. 29,485-29,508, vol. 104, No. B12.

(Continued)

*Primary Examiner*—Mark Hellner
(74) *Attorney, Agent, or Firm*—Helene Raybaud; James McAleenan; Brigid Laffey (57) ABSTRACT

Methods and devices are provided for investigating an earth formation use electro-kinetics and/or electro-osmosis measurements. In one example, the method includes creating a pressure difference in the earth formation proximate to a wellbore; measuring a generated electro-kinetic property of the earth formation proximate to the wellbore, the generated electro-kinetic property generated by the pressure difference; applying an electric field to the earth formation proximate to the wellbore; measuring a generated pressure change in the earth formation proximate to the wellbore, the generated pressure change generated by the electric field; and determining wettability of the earth formation proximate to the wellbore by the use of the measurement of the generated electro-kinetic property and the measurement of the generated pressure change.

23 Claims, 6 Drawing Sheets

OTHER PUBLICATIONS

Pride, S., Governing equations for the coupled electromagnetics and acoustics of porous media, Physical Review B, Dec. 1994, pp. 15678-15696, vol. 50, No. 21.

Looyestijn, et al, "Wettability-index determination by nuclear magnetic resonance", SPR Reservoir Evaluation & Engineering, Apr. 2006, pp. 146-153.

Slobod, et al., "Method for determining wettability of reservoir rocks", Petroleum Transactions, AIME, SPE 137-G, vol. 195, 1952, 4 pgs.

* cited by examiner

WETTABILITY FROM ELECTRO-KINETIC AND ELECTRO-OSMOSIS MEASUREMENTS

FIELD OF THE INVENTION

This invention relates broadly to characterizing earth formations. More particularly, this invention relates to apparatus and methods for the use of measuring electro-kinetic and/or electro-osmosis properties of a formation to determine wettability of the formation.

BACKGROUND

Large volumes of oil remain in oil-wet and mixed-wet carbonate reservoirs. By determining whether a formation is water-wet, oil-wet or mixed-wet, the location of the oil can be determined to guide efforts to obtain the oil. Wettability of rocks is a parameter in the characterization of reservoirs and is difficult to measure in situ in the wellbore. There are indications that water-wet sandstones may become oil-wet in the invaded zone of wells drilled with oil-based mud. Knowledge of the wettability of the invaded zone is typically important in the interpretation of Rxo and the nuclear magnetic resonance logs. Wettability of rocks can be determined from core analysis and/or a combination of wireline logs such as resistivity logs, nuclear logs, and nuclear magnetic resonance logs.

However, various methods known in the art for determining wettability involve drawbacks, including substantial amounts of time to obtain a measurement and the need to provide and store radioactive materials.

The electro-kinetic coupling constants of rock samples can be measured accurately in the laboratory. The coupling constants of a large number of water-wet rock samples have already been determined. David B. Pengra, Po-zen Wong, Low frequency AC Electrokinetics, Colloids and Surfaces, 159 (1999) 283-292. However, accurate measurement of the coupling constant in situ in a foundation is more difficult because of the limitations of the measurement geometry. Sensors are typically located only in the borehole; it is usually not practical to isolate a section of rock for measurement. Therefore, the measurements have to be made in an open geometry and are more subject to the uncertainties caused by heterogeneity, anisotropy, bed boundary effects, borehole effects, etc. In principle, the problems are not different from those of any wireline measurements, for example, from the problems of the accurate measurement of resistivity by wireline tools.

SUMMARY

Various embodiments of the present invention can address some of the deficiencies of the art. Embodiments of this invention are directed toward the determination of wettability from electro-kinetics and/or electro-osmosis measurements. In water wet rocks, there exists a charged dipole layer at the interface between the water and the rock matrix. The mobile positive charges are in the water and the immobile negative charges are in the rock matrix. An electro-kinetic current is proportional to the pressure gradient, and a proportional constant is the electro-kinetic coupling constant. A fluid current is proportional to the electric field, and the proportional constant is the electro-osmosis coupling constant, which is equal to the electro-kinetic coupling constant.

The electro-kinetic coupling constant is a property of the rock and is strongly dependent on the wettability of the rock. In oil wet rocks, the interface between the rock matrix and water does not exist. Instead, there is the interface of rock matrix with oil and the interface of oil with water. The magnitude and the sign of the coupling constant can be used to distinguish between oil wet rocks and water wet rocks. For rocks of mixed wettability, the values of the coupling constant can be somewhere in between those of water wet rocks and oil wet rocks. The coupling constant measured in the borehole can be used to quantitatively characterize rocks of mixed wettability by comparing with a data base built up with laboratory measurements on cores of different rocks and different mixed wettability.

In one embodiment of the invention, a method includes creating a pressure difference in the earth formation proximate to a wellbore; measuring a streaming potential of the earth formation proximate to the wellbore, the streaming potential generated by the pressure difference; and determining wettability of the earth formation proximate to the wellbore by the use of the measurement of the streaming potential. In some embodiments the pressure difference has a frequency of less than 1 Hz. In other embodiments, the pressure difference has a seismic frequency. In other embodiments, the pressure difference has an acoustic frequency. In other embodiments, the pressure difference has an ultrasonic frequency.

In another example embodiment of the invention, a method includes creating a pressure difference in the earth formation proximate to a wellbore; measuring a generated electro-kinetic property of the earth formation proximate to the wellbore, the generated electro-kinetic property generated by the pressure difference; applying an electric field to the earth formation proximate to the wellbore; measuring a generated pressure change in the earth formation proximate to the wellbore, the generated pressure change generated by the electric field; and determining wettability of the earth formation proximate to the wellbore by the use of the measurement of the generated electro-kinetic property and the measurement of the generated pressure change.

In another illustrative embodiment of the invention, an apparatus for investigating an earth formation includes a pressure differential source adapted to create a pressure difference in the earth formation proximate to a wellbore; a sensor adapted to measure a streaming potential of the earth formation proximate to the wellbore, the streaming potential generated by the pressure difference; and a processor adapted to determine wettability of the earth formation proximate to the wellbore by the use of the measurement of the streaming potential.

A further illustrative embodiment of the invention provides an apparatus having a pressure differential source adapted to create a pressure difference in the earth formation proximate to a wellbore; a first sensor adapted to measure a generated electro-kinetic property of the earth formation proximate to the wellbore, the generated electro-kinetic property generated by the pressure difference; at least one electrode to apply an electric field to the earth formation proximate to the wellbore; a second sensor adapted to measure a generated pressure change in the earth formation proximate to the wellbore, the generated pressure change generated by the electric field; and a processor adapted to determine wettability of the earth formation proximate to the wellbore by the use of the measurement of the generated electro-kinetic property and the measurement of the generated pressure change.

BRIEF DESCRIPTION OF THE DRAWINGS

The invention will be apparent from the description herein and the accompanying drawings.

DETAILED DESCRIPTION

Various embodiments of this invention provide methods and devices for the determination of wettability of an earth formation from the use of electro-kinetics and electro-osmosis measurements. The electro-kinetic coupling constant and electro-osmosis coupling constant are equal to each other and are strongly dependent on the wettability of the rock. The coupling constants of oil wet rocks may be much smaller than, and of the opposite sign, to those of water wet rocks. The magnitude and the sign of the coupling constant can be used to distinguish between oil wet rocks and water wet rocks. For rocks of mixed wettability, the values of the coupling constant will be somewhere in between those of water wet rocks and oil wet rocks. According to some embodiments, the coupling constant measured in the wellbore can be used to quantitatively characterize rocks of mixed wettability by comparing with a data base built up with laboratory measurements on cores of different rocks and different mixed wettability.

Figure 1A:
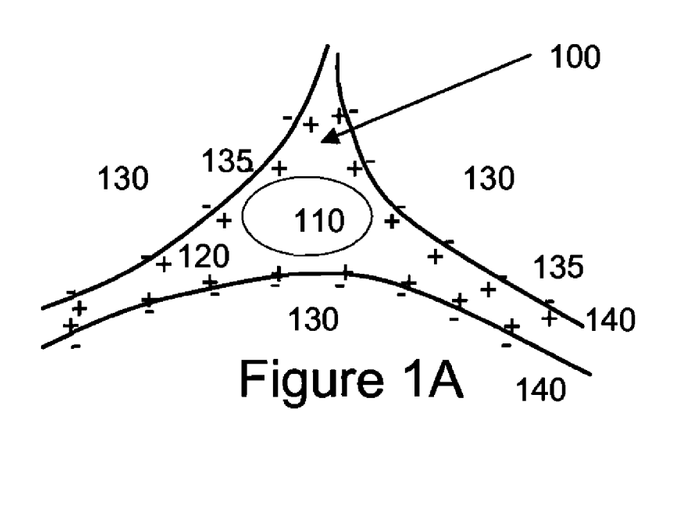
FIG. 1A is a perspective view of a pore of a water wet rock.
Figure 1B:
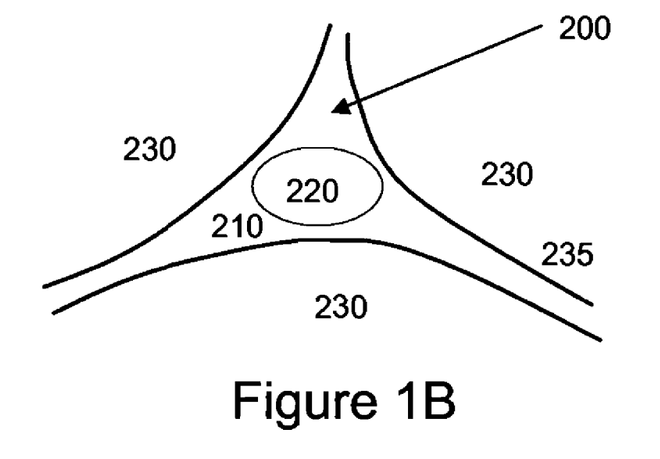
FIG. 1B is a perspective view of a pore of an oil wet rock.

In water wet rocks, there exists a charged dipole layer at the interface between the water and the rock matrix. The mobile positive charges are in the water and the immobile negative charges are in the rock matrix. A schematic drawing of a pore 100 in a water-wet rock and a pore 200 in an oil-wet rock is shown in FIGS. 1A and 1B. In FIG. 1A, the oil 110 is substantially surrounded by water 120. The water 120 is in substantial contact with the water wet rock 130 at the water-matrix interface 135. The existence of the charged dipole layer 140 gives rise to two phenomena: electro-kinetics and electro-osmosis. Electro-kinetics includes the generation of electric currents (electro-kinetic currents) by pressure gradients in the rock, and electro-osmosis is the generation of fluid movement by electric fields in the rock. The electro-kinetic current is proportional to the pressure gradient, and the proportional constant is the electro-kinetic coupling constant. The fluid current is proportional to the electric field, and the proportional constant is the electro-osmosis coupling constant, which is equal to the electro-kinetic coupling constant. The electro-kinetic coupling constant is a property of the rock and is strongly dependent on the wettability of the rock.

In oil-wet reservoir rocks, there is no water-matrix interface and no charge dipole layer associated with that interface, as shown in FIG. 1B. At the oil-matrix interface, the polar molecules in the crude oil 210 may give rise to a limited amount of electro-kinetic coupling. The water 220 is largely kept away from the oil wet rock 230. However, the coupling is expected to be much weaker than the coupling in water-wet rocks, since not much electric current can originate from the oil-matrix interface 235. There is some experimental evidence that the coupling constant in oil-wet rock is orders of magnitude smaller than that of the water-wet rock and may even be of the opposite sign. Saad F. Alkafeef, Meshal K. Algharaib, Abdullah F. Alajmi, Hydrodynamic thickness of petroleum oil adsorbed layers in the pores of reservoir rocks, Journal of Colloid and Interface Science, 298 (2006) p. 13-19.

The charged dipole layer is the source of the electro-kinetic coupling. When fluid moves under an applied pressure gradient, the mobile positive charge will move with the fluid. At DC and quasi-stationary states, this charge movement gives rise to a streaming potential (electro-kinetic voltage changes). At AC frequencies, this charge movement is the source of the acoustic-electric coupling. When the mobile positive charge moves under an applied electric field, the fluid will move with the charge. At DC and quasi-stationary states, this fluid movement is called electro-osmosis. At AC frequencies, this fluid movement is the source of the electro-acoustic coupling. The magnitude of the streaming potential and electro-osmosis depends on the electro-kinetic coupling constants. Onsager's reciprocity theorem states that the coupling constants for streaming potential and for electro-osmosis are equal to each other. At AC frequencies, the coupling constants for acoustic-electric coupling and for electro-acoustic coupling are also equal to each other and are frequency dependent.

At seismic, acoustic, or ultrasonic frequencies, electro-kinetics can be observed by measuring electric signals induced by seismic, acoustic, or ultrasonic sources. Electro-osmosis can be observed by measuring seismic, acoustic, or ultrasonic signals induced by electric sources of the same frequency.

As discussed above, the source of the electro-kinetics and electro-osmosis are the charged dipole layer at interfaces. The mathematics is given by the following equations.

$$i = -\sigma \nabla V - L \nabla p \quad (1)$$

$$q = -L \nabla V - \frac{k}{\mu} \nabla p \quad (2)$$

The electric current i in Eq. (1) has two terms. The first term is the conduction current, which is proportional to the electric potential gradient $\nabla V$ or the electric field $E(=-\nabla V)$, and the proportional constant is the conductivity $\sigma$. The second term is the electro-kinetic current, which is proportional to the pressure gradient $\nabla p$ and the electro-kinetic coupling constant L. The fluid current q in Eq. (2) also has two terms. The first term is the electro-osmosis current, which is proportional to the electric field and the electro-kinetic coupling constant. The second term describes the Darcy flow: k is the permeability and $\mu$ is the viscosity.

The electric field and the pressure in the formation are coupled together by Eqs. (1-2). As noted above, electro-kinetics describes the generation of electric currents and voltages changes in the reservoir formation by pressure changes. At DC and very low frequencies, the pressure changes can be created by opening and closing of control valves and pumps and monitored by pressure sensors. The control valves, pumps and pressure sensors may be placed in the wellbore or at the surface. At seismic, acoustic or ultrasonic frequencies, the pressure changes can be created by seismic, acoustic or ultrasonic transmitters placed in the wellbore or at the surface. The generated electric currents (electro-kinetic current) and voltage changes (streaming potential) can be measured by electronics connected to electrodes placed in the wellbore. The pressure changes, or the seismic, acoustic or ultrasonic signals will be called the transmitted signals for electro-kinetics, and the electric currents or voltages will be called the received signals.

As discussed above, electro-osmosis describes the generation of fluid currents and pressure changes in the reservoir formation by applied electric fields. The applied electric fields can be created by electronics connected to electrodes placed in the wellbore. At DC or very low frequencies, the generated pressure changes can be monitored by pressure sensors placed in the wellbore. At seismic, acoustic or ultrasonic frequencies, the generated pressure changes can be monitored by seismic, acoustic or ultrasonic receivers placed in the wellbore. The applied electric fields will be called the transmitted signals for electro-osmosis, and the pressure changes, the seismic, acoustic or ultrasonic signals will be called the received signals.

The strength of coupling between the electric field and the pressure in the formation is determined by the coupling constant L. Since the coupling arises mainly from the charged dipole layer at the interface between the rock matrix and water, the coupling constant is very sensitive to whether the rock is oil wet or water wet. The coupling constant is expected to be small for oil wet rocks and may be of the opposite sign to the coupling constant of water wet rocks. A small coupling constant means that for a given strength of transmitted signal, the received signal strength is weak. The coupling constants of water wet rocks and strongly oil wet rocks are extremely different. A simple threshold applied to the received signal strength for a given level of transmitted signal strength can be used to distinguish between these two types of rocks. The coupling constant L can be determined from the transmitted signals and the received signals by solving Eqs. (1-2).

The electro-kinetic coupling constants of purely oil-wet rocks may be orders of magnitude smaller than those of water-wet rocks. Therefore, the accuracy of the measurement of the coupling constant may not be significant in some applications of the invention, if the purpose is simply to distinguish between water-wet rocks from purely oil-wet rocks.

In one example, the strongly oil wet rock and the water wet rock may be distinguished from each other by applying a threshold to the received signal strength for a given level of transmitted signal strength.

There are many possible ways to create and measure streaming potential in electro-kinetics in the borehole. Various embodiments of the invention may be practiced using wireline tools. Also, streaming potentials and electro-osmosis can also be measured with logging while drilling (LWD) tools and/or permanent installations.

There exists a body of invention disclosures on the measurements of streaming potential with wireline, logging while drilling (LWD), and permanent installations in the oilfield. Examples include: U.S. Pat. No. 6,978,672 and U.S. Published Application No. 2005/280419A1, both to Chen et al.; U.S. Published Application No. 2006/0125474 to Chen et al.; U.S. Published Application No. 2006/0089804 to Chen et al.; U.S. application Ser. No. 11/223,644 filed Sep. 9, 2005 to Chen et al.; U.S. application Ser. No. 11/223,676 filed Sep. 9, 2005 to Chen et al.; U.S. Published Application No. 2005/0279495 to Chen et al.; and U.S. Published Application No. 2005/0279497 to Chen et al., hereby incorporated by reference.

Figure 2:
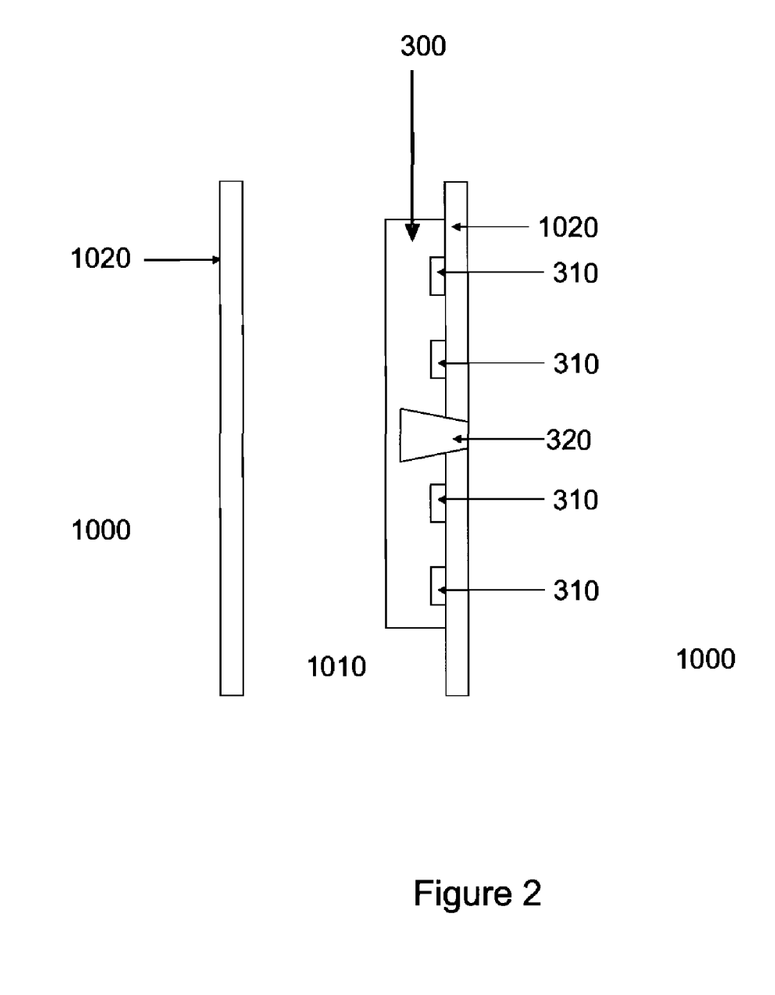
FIG. 2 is a perspective view of a Schlumberger Modular Formation Dynamics Tester (MDT™) tool according to a first illustrative embodiment of the invention.

According to an illustrative embodiment of the invention, by way of non-limiting example, an existing Schlumberger Modular Formation Dynamics Tester (MDT™) tool 300 may be modified by adding an array of electrodes 310, shown schematically in FIG. 2. Fluid can be produced from the formation 1000 or injected into the formation 1000 from the MDT™ probe 320 in the wellbore 1010, and the accompanying streaming potential can be measured with the array of electrodes shown in the figure. The pressure sensors in the MDT™ can be used to determine formation pressure and the fluid injection or production pressure. The presence of mudcakes 1020 is not a problem since the MDT™ probe penetrates the mudcake 1020.

When fluid is first produced from or injected into the formation at the probe, a pressure transient will be created in the formation. In very early time, the pressure gradient is highest in the shallow zone. The streaming current is proportional to the coupling constant and proportional to the pressure gradient. Therefore, in early time, the streaming potential is sensitive to the wettability of the invaded zone. In later time, the pressure gradient diffuses deeper into the formation, and the streaming potential becomes more sensitive to the wettability of the uninvaded zone. The early time data have a shallow depth of investigation, and the late time data have a deeper depth of investigation.

The concept of measuring streaming potential with electrodes attached to MDT™/RFT™ type of probes is addressed in U.S. Pat. No. 4,427,944 to Chandler, et al., assigned to Schlumberger Technology Corporation. In some examples, the modification to the MDT tool can be as simple as adding a single electrode.

From the pressure data and from the streaming potential data, the coupling constant can be computed using a fluid diffusion model. The wettability of the formation can then be determined from the magnitude and the sign of the coupling constant.

Electro-kinetics may also be measured at acoustic frequencies. A wireline acoustic electro-kinetics tool 400 is shown schematically in FIG. 3. The tool is illustrated in the wellbore 1010 by the use of a wireline 405. On the tool 400 there is an acoustic transmitter 410 to generate pressure oscillations in the formation 1000, one or more acoustic receivers 420 to detect magnitude of the pressure oscillations inside the formation 1000, and one or more electrodes 430 to detect streaming potential. The electro-kinetic coupling constant at the acoustic frequencies can be inverted from the acoustic and the electric measurements. The presence of mudcake 1020 is not a problem, since both the acoustic and the electric signal can penetrate through the mudcake 1020. Compensation may be provided for the streaming potential created by the acoustic wave in the mudcake.

Figure 3:
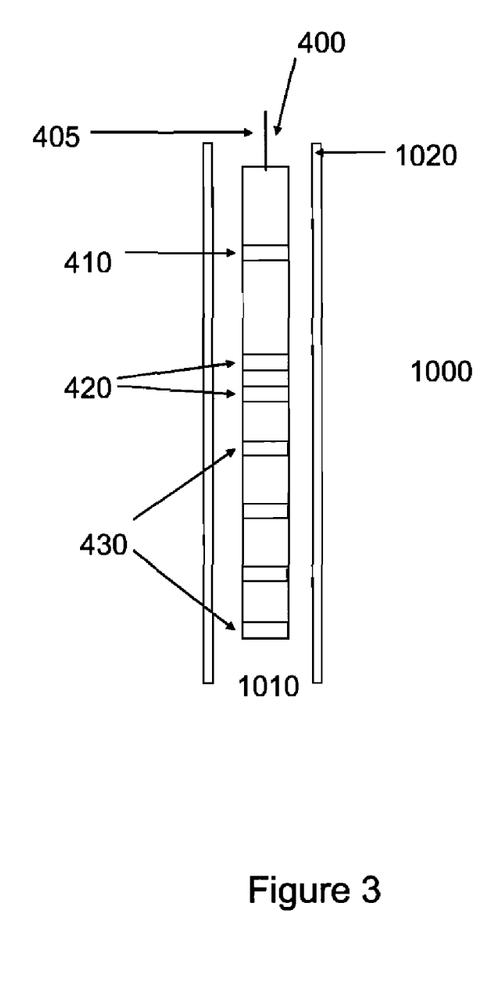
FIG. 3 is a perspective view of a wireline acoustic electro-kinetics tool according to a second illustrative embodiment of the invention.
Figure 4:
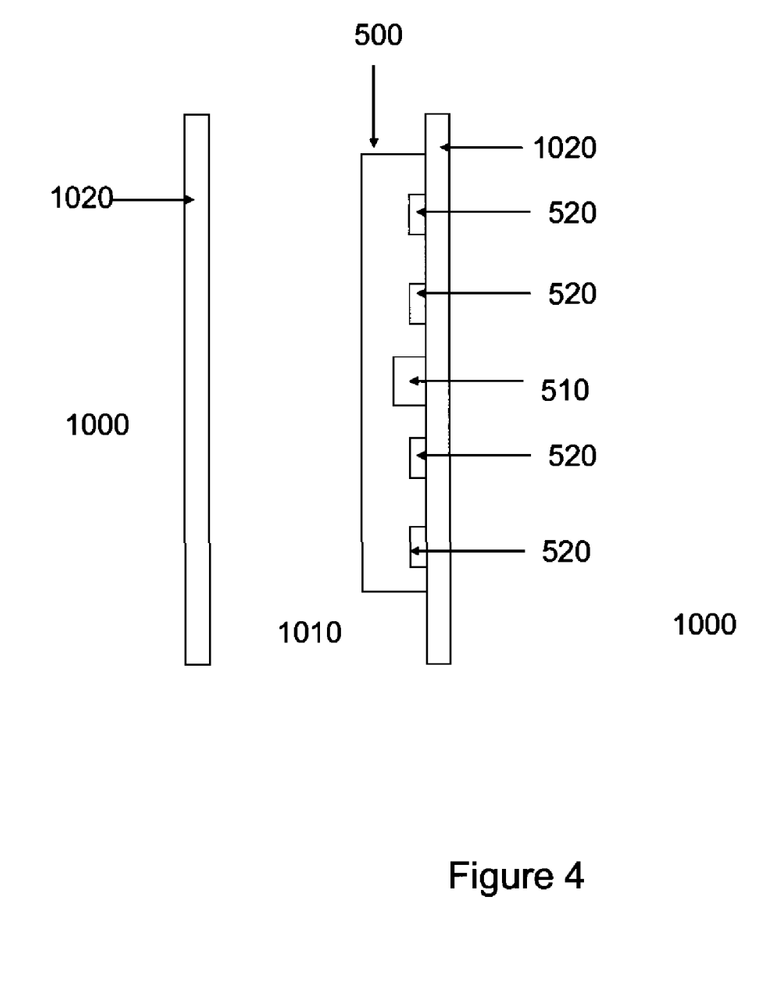
FIG. 4 is a perspective view of a wireline ultrasonic electro-kinetics tool according to a third illustrative embodiment of the invention.

Alternatively or in addition, the acoustic transmitter, receivers, and electrodes of FIG. 3 may optionally be mounted on a pad articulated against the formation. This arrangement will improve the acoustic coupling to the formation and aid in measurements to be made at ultrasonic frequencies. A further example is illustrated in FIG. 4, in which a tool 500 is schematically illustrated in a wellbore 1010 in the form of a pad articulated against the mudcake 1020 proximate to the formation 1000. The tool 500 includes an ultrasonic transducer 510 and plurality of electrodes 520 against the mudcake 1020 proximate to the formation 1000.

Both electro-acoustic and acoustic-electric measurements can be made at seismic, sonic, or ultrasonic frequencies. Since the electro-kinetic coupling constant is frequency dependent, one example embodiment makes the measurement at a fixed frequency to simplify the interpretation for wettability, although the invention is not so limited. In the example, the electro-acoustic measurements used electric transmitters and acoustic receivers since it is easier to produce a narrow band electric source with high duty cycle and strong signal. The frequency range of 50 kHz to 500 kHz may be appropriate since the road noise might be lower at ultrasonic frequencies. At higher ultrasonic frequencies, it may be desirable to have the transducer mounted on a pad pushed against the formation to avoid attenuation in the mud. On the pad there are one or more electrodes as the transmitter of the electric signal, and one or more acoustic transducers to receive the acoustic signal. This measurement concept may be able to produce a continuous wettability log. The depth of investigation can be controlled by the transmitted electric signal exactly as in resistivity logs. The signal from electro-kinetic coupling in the mudcake should be small since the mudcake thickness is small compared with the depth of investigation. For oil-wet rock, correction for the effects of the water-wet mudcake may be provided.

Another embodiment of the invention uses similar configurations, but uses a seismic source instead of, or in addition to, acoustic or ultrasonic sources. The tool can be very similar to borehole seismic tools with electrodes placed alongside the seismic receivers.

Figure 5:
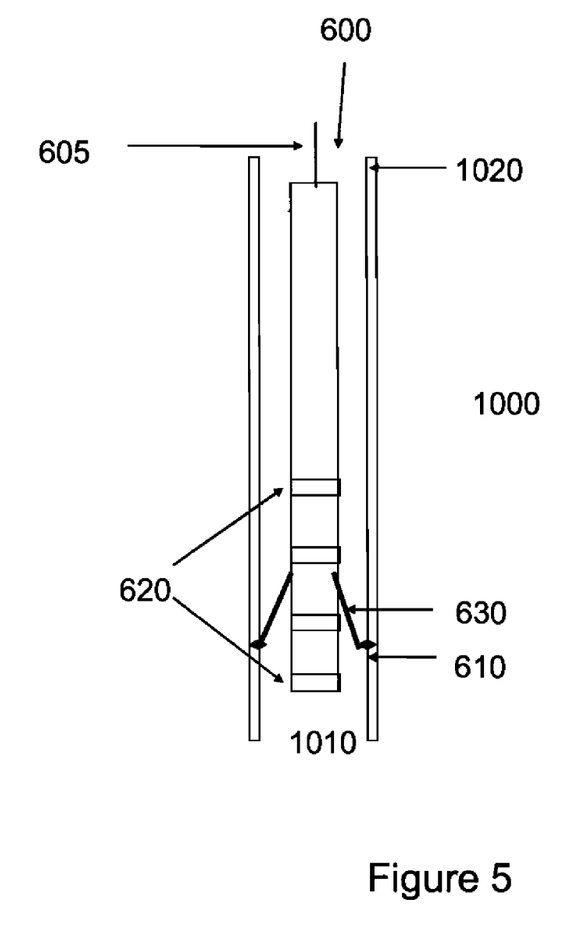
FIG. 5 is a perspective view of a wireline acoustic electro-kinetics tool having a mudcake removing tool according to a fourth illustrative embodiment of the invention.

Optionally, a pressure pulse may be created inside the formation by temporarily removing the mudcake. This can be achieved by having a mudcake removing device on the tool, shown schematically in FIG. 5. The cutting edge 610 may be replaced by a sucking device to remove the mudcake. Mudcake will build back quickly under overbalancing pressure, but in the mean time, a pressure transient has been created in the formation. The pressure transient creates a streaming potential transient, which is detected by the array of electrodes 620. The mudcake removal device and the electrodes may optionally be placed on a pad pushed against the formation by the use of a retractable arm 630.

Figure 6:
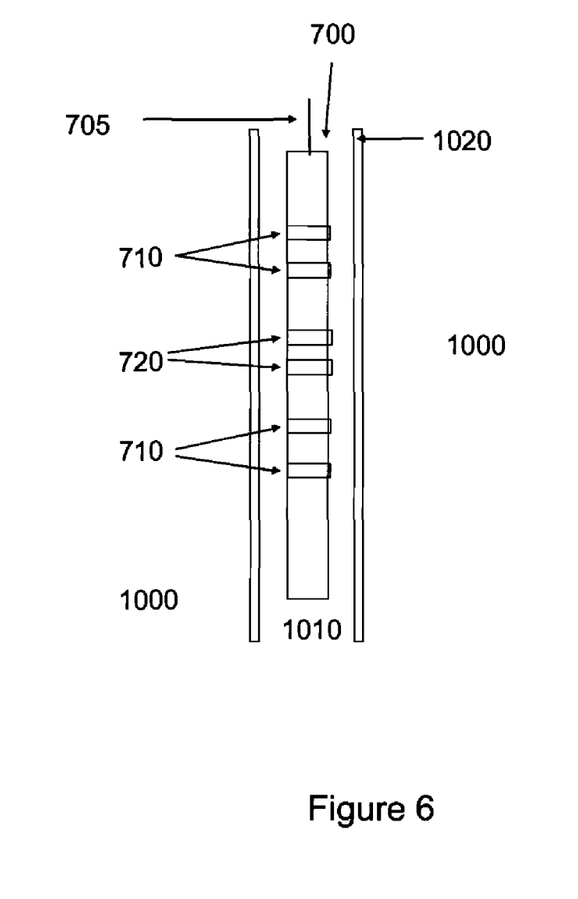
FIG. 6 is a perspective view of a wireline acoustic electro-osmosis tool according to a fifth illustrative embodiment of the invention.

There are many ways to perform electro-osmosis measurements in the borehole. One way is to measure electro-osmosis at acoustic frequencies. For example, a wireline acoustic electro-osmosis tool 700 is shown schematically in FIG. 6 having a wireline 705 and located in a wellbore 1010. On the tool there will be an array of electrodes 710 to transmit electric signals at acoustic frequencies, and one or more acoustic receivers 720. The electro-kinetic coupling constant at the acoustic frequencies can be inverted from the monitored electric sources and received acoustic signals. The measurements can also be made as seismic and/or ultrasonic frequencies. Another way is to have the acoustic receivers articulated against the formation. Acoustic receivers articulated against the formation will improve the received signal strength and avoid the complications of acoustic propagation in the borehole. The measurements can also be made at seismic or ultrasonic frequencies.

Many reservoirs have rocks of mixed wettability. For the interpretation of field data in reservoirs of mixed wettability, one can do laboratory experiments on different rocks with different mixed wettability to build a data base. The coupling constant L determined with the field data can then be compared with the data base to determine the mixed wettability, assuming that the rock type is known from other logs. For the purpose of quantitatively characterizing rocks of mixed wettability, it may be beneficial to have tools that can measure the electro-kinetic coupling constant with sufficient accuracy. To, in one example, quantitatively characterize rocks of mixed wettability with a new wireline measurement concept, data can be gathered in at least three areas: numerical simulation, laboratory experimentation, and field studies.

Optionally, the electro-kinetic coupling constants measured in the field tests can be compared with laboratory measurements on cores. It may be preferred to take preserved cores to be sure that the wettability has not changed during the coring and the retrieving process.

The illustrative embodiments, implementations and examples herein are meant to be illustrative and not limiting. The present invention has been described by way of example, and modifications and variations of the exemplary embodiments will suggest themselves to skilled artisans in this field without departing from the spirit of the invention. Features and characteristics of the above-described embodiments may be used in combination. The preferred embodiments are merely illustrative and should not be considered restrictive in any way.

What is claimed is:

1. A method for investigating an earth formation, comprising:
    creating a pressure difference in the earth formation proximate to a wellbore;
    measuring a streaming potential of the earth formation proximate to the wellbore, the streaming potential generated by the pressure difference;
    determining wettability of the earth formation proximate to the wellbore by the use of at least one of an electro-osmosis coupling constant of the earth formation and an electro-kinetic coupling constant of the earth formation derived from the measurement of the streaming potential.

2. The method of claim 1, wherein, in the act of creating, the pressure difference has a frequency of less than 1 Hz.

3. The method of claim 1, wherein, in the act of creating, the pressure difference has a seismic frequency.

4. The method of claim 1, wherein, in the act of creating, the pressure difference has an acoustic frequency.

5. The method of claim 1, wherein, in the act of creating, the pressure difference has an ultrasonic frequency.

6. The method of claim 1, wherein, in the act of determining, the electro-kinetic coupling constant is determined and a mixed wettability value is determined by reference to a plurality of electro-kinetic coupling constants correlated to a plurality of mixed wettability values for a known rock type.

7. A method for investigating an earth formation, comprising:
    applying an electric field to the earth formation proximate to the wellbore;
    measuring a generated pressure change in the earth formation proximate to the wellbore, the generated pressure change generated by the electric field;
    determining wettability of the earth formation proximate to the wellbore by the use of at least one of an electro-osmosis coupling constant of the earth formation and an electro-kinetic coupling constant of the earth formation derived from the measurement of the generated pressure.

8. The method of claim 7, wherein, in the act of applying, the electric field has a frequency of less than 1 Hz.

9. A method for investigating an earth formation, comprising:
    creating a pressure difference in the earth formation proximate to a wellbore;
    measuring a generated electro-kinetic property of the earth formation proximate to the wellbore, the generated electro-kinetic property generated by the pressure difference;
    applying an electric field to the earth formation proximate to the wellbore;
    measuring a generated pressure change in the earth formation proximate to the wellbore, the generated pressure change generated by the electric field;
    determining wettability of the earth formation proximate to the wellbore by the use of at least one of an electro-osmosis coupling constant of the earth formation and an electro-kinetic coupling constant of the earth formation derived from the measurement of the generated electro-kinetic property and the measurement of the generated pressure change.

10. The method of claim 9, wherein, in the act of determining, at least one of an electro-osmosis coupling constant and an electro-kinetic coupling constant is compared to data corresponding to a plurality of mixed wettability values for a known rock type.

11. The method of claim 9, wherein, in the act of measuring a generated electro-kinetic property, the electro-kinetic property is streaming current.

12. The method of claim 9, wherein, in the act of measuring a generated electro-kinetic property, the electro-kinetic property is streaming potential.

13. The method of claim 9, wherein the act of determining comprises comparing at least one of the generated electro-kinetic property and the generated pressure change to a threshold to determine whether the earth formation proximate to the wellbore is oil wet or water wet.

14. An apparatus for investigating an earth formation, comprising:
- a pressure differential source adapted to create a pressure difference in the earth formation proximate to a wellbore;
- a sensor adapted to measure a streaming potential of the earth formation proximate to the wellbore, the streaming potential generated by the pressure difference; and
- a processor adapted to determine wettability of the earth formation proximate to the wellbore by the use of at least one of an electro-osmosis coupling constant of the earth formation and an electro-kinetic coupling constant of the earth formation derived from the measurement of the streaming potential.

15. The apparatus of claim 14, wherein the pressure differential source emits a frequency of less than 1 Hz.

16. The apparatus of claim 14, wherein the pressure differential source emits a seismic frequency.

17. The apparatus of claim 14, wherein the pressure differential source emits an acoustic frequency.

18. The apparatus of claim 14, wherein the pressure differential source emits an ultrasonic frequency.

19. The apparatus of claim 14, wherein at least the pressure differential source and the sensor are integrated into one of the group of a wireline tool and a logging-while-drilling tool.

20. An apparatus for investigating an earth formation, comprising:
- a pressure differential source adapted to create a pressure difference in the earth formation proximate to a wellbore;
- a first sensor adapted to measure a generated electro-kinetic property of the earth formation proximate to the wellbore, the generated electro-kinetic property generated by the pressure difference;
- at least one electrode to apply an electric field to the earth formation proximate to the wellbore;
- a second sensor adapted to measure a generated pressure change in the earth formation proximate to the wellbore, the generated pressure change generated by the electric field; and
- a processor adapted to determine wettability of the earth formation proximate to the wellbore by the use of at least one of an electro-osmosis coupling constant of the earth formation and an electro-kinetic coupling constant of the earth formation derived from the measurement of the generated electro-kinetic property and the measurement of the generated pressure change.

21. The apparatus of claim 20, wherein the first sensor measures streaming current.

22. The apparatus of claim 20, wherein the first sensor measures streaming potential.

23. The apparatus of claim 20, wherein at least the pressure differential source, the first sensor and the second sensor are integrated into one of the group of a wireline tool and a logging-while-drilling tool.

* * * * *